United States Patent [19]

Chow et al.

[11] Patent Number: 4,676,308

[45] Date of Patent: Jun. 30, 1987

[54] DOWN-HOLE GAS ANCHOR DEVICE

[75] Inventors: Robert B. Chow, Walnut; Richard V. Nelson, Fullerton, both of Calif.

[73] Assignee: Chevron Research Company, San Francisco, Calif.

[21] Appl. No.: 801,174

[22] Filed: Nov. 22, 1985

[51] Int. Cl.[4] .......................................... E21B 43/38
[52] U.S. Cl. .................... 166/369; 166/105.5; 210/188; 55/190
[58] Field of Search ............... 166/105.5, 105.6, 242, 166/265, 369, 372; 210/188; 55/189, 190, 184

[56] References Cited

U.S. PATENT DOCUMENTS

| Re. 30,836 | 12/1981 | Bunnelle | 166/105.5 |
| 1,578,720 | 3/1926 | Derby | 166/105.5 |
| 1,604,019 | 10/1926 | Carnes | 166/105.5 |
| 2,317,219 | 4/1943 | Porter et al. | 166/105.5 |
| 3,175,501 | 4/1965 | Carle | 103/102 |
| 3,291,057 | 12/1966 | Carle | 103/113 |
| 3,887,342 | 6/1975 | Bunnelle | 55/203 |
| 3,972,352 | 8/1976 | Bunnelle | 138/42 |
| 4,074,763 | 2/1978 | Stevens | 166/325 |
| 4,297,084 | 10/1981 | Wayt | 417/179 |
| 4,366,861 | 1/1983 | Milam | 166/105.5 |
| 4,386,653 | 6/1983 | Drake | 166/105 |
| 4,481,020 | 11/1984 | Lee et al. | 166/105.5 |
| 4,531,584 | 6/1985 | Ward | 166/265 |

FOREIGN PATENT DOCUMENTS 0688605 10/1979 U.S.S.R. ..................... 166/105.5

Primary Examiner—James A. Leppink
Assistant Examiner—Terry Lee Melius
Attorney, Agent, or Firm—S. R. LaPaglia; E. J. Keeling; V. A. Norviel

[57] ABSTRACT

The present invention is used to separate gas from liquid while being placed downhole in a hydrocarbon producing well. It essentially comprises a means to divert hydrocarbon production fluid from within a tubing string into the annulus of the well. This diversion turbulently mixes the fluid and releases free gas from the liquid. Thereafter, the liquid migrates downward while the free gas migrates upward to a gas collection apparatus. The liquid is reuptaken at an intake spot below the point at which it was diverted. It travels upward through a concentric chamber and subsequently reenters the tubing string at a point above that which it was diverted.

4 Claims, 4 Drawing Figures

U.S. Patent　　Jun. 30, 1987　　4,676,308
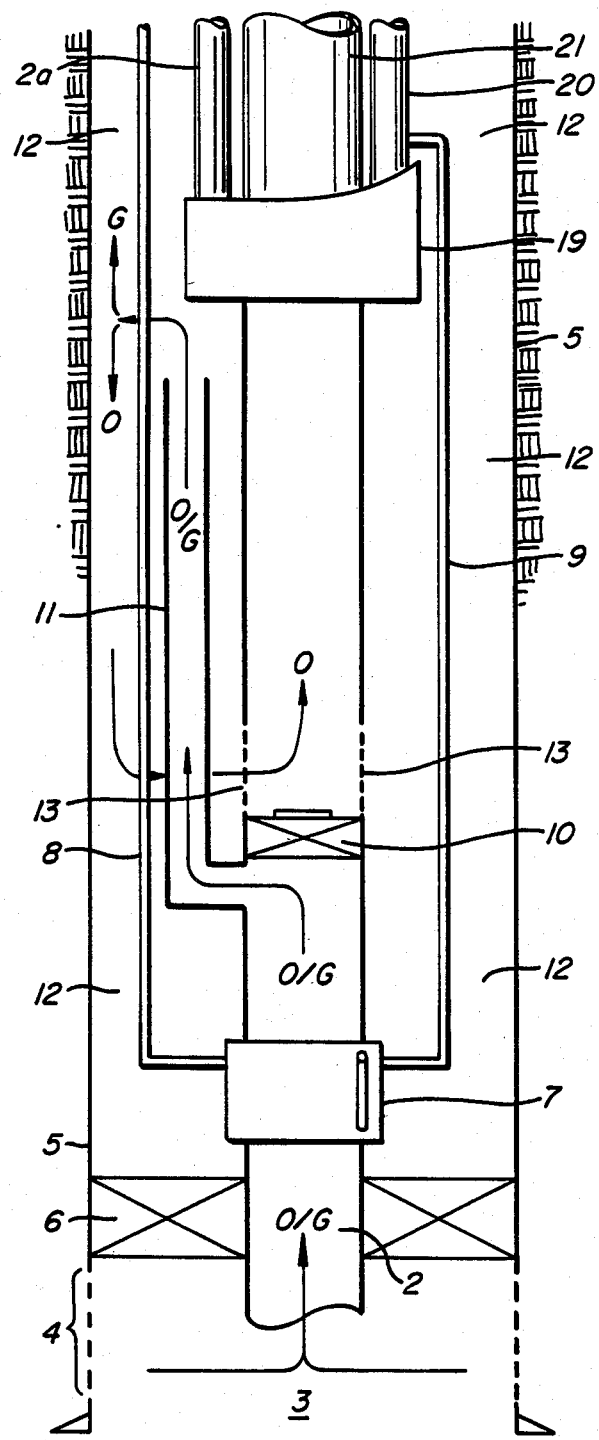
FIG._1.
PRIOR ART
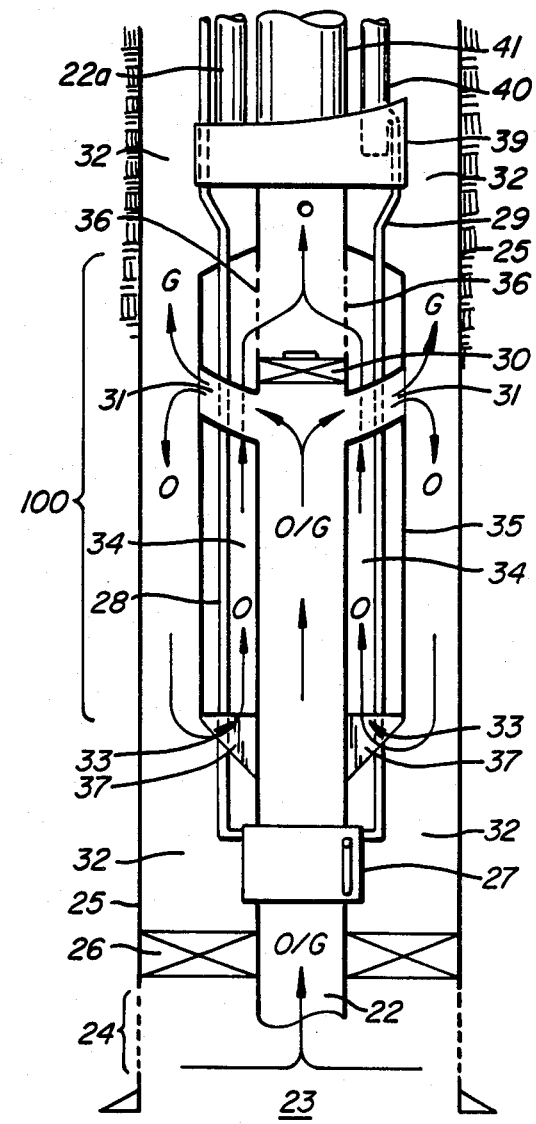
FIG._2.
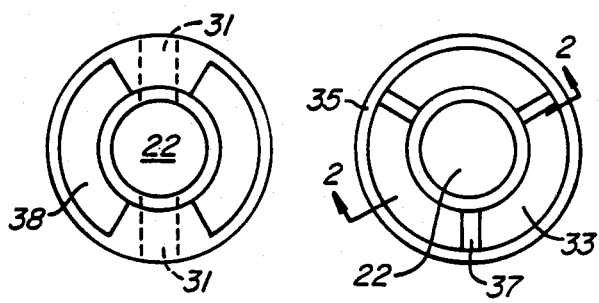
FIG._3.　　FIG._4.

DOWN-HOLE GAS ANCHOR DEVICE

BACKGROUND OF THE INVENTION

1. Field of the Invention

This invention generally relates to the separation of gas from a liquid/gas mixture. Here, the present application is directed towards separating gas from an oil/gas mixture with a device that is mounted down a subterranean oil formation.

2. Background Information

It is known that certain oil/gas wells, producing from low pressure formations, require artificial lift such as downhole pumping in order in bring the oil/gas to the surface for recovery. It is also necessary to use downhole pumping equipment in some oil/gas wells which have low pressure due to the formation pressure being expended. The artificial lift devices that are most commonly used include: sucker rod pumps; hydraulic pumps; and electric submersible pumps. The former two devices are both downhole reciprocating pumps which are actuated by a surface pumping unit with sucker rods and a surface hydraulic power fluid unit, respectively. The electric submersible pump, on the other hand, is a centrifugal device powered by an electric motor. It is mounted down-hole in a well.

Most oil wells do produce some gas. However, the presence of the gas, which tends to come out of the oil/gas mixture as it leaves the formation and enters the borehole, can cause operating problems to these pumping devices. Here, gas can become trapped in the pump chamber which causes a loss of efficiency, malfunction of the pump, and even physical damage to the different parts of the pump. This "gas lock" is such a common phenomenon in reciprocating pumps that many wells cannot be produced because the well fluids contain too much gas.

Efforts have been made to separate out the gas from an oil/gas mixture that comes out of the production zone and enters into the pumping devices. For example, U.S. Pat. No. 4,074,763 discloses a tool to be mounted near the end of the production string that uses a series of concentric conduits that generate centrifugal force for separating gas out of the oil/gas mixture. U.S. Pat. No. 4,366,861 separates an oil/gas mixture by reversing the production fluid flow to liberate free gas. Other devices utilize the input of mechanical energy to create centrifugal force to separate oil from gas. These devices are listed as follows: U.S. Pat. Nos.: 3,175,501; 3,972,352; 3,887,342; 3,291,057; 4,386,653; 4,481,020; and re 30,836.

Another conventional method to provide the oil and gas separation is to use a spill-over tube design as illustrated in FIG. 1. While this design allows a good separation of gas and liquid, it has one major drawback. The spill-over tube points upward, which makes retrieval, or fishing operations, of downhole equipment significantly more complicated. To eliminate the disadvantage of the prior art, including the spill-over tube, the present invention was developed.

SUMMARY OF THE INVENTION

The present invention is a concentric chamber gas anchor for separating free gas from liquid in well production fluid. It is located downhole in a hydrocarbon producing well and comprises a casing packer located in the annulus of the well, a subsurface safety valve located in the tubing string above the casing packer, and a tubing plug located in the tubing string above the subsurface safety valve (whose purpose is to divert the flow of production fluid from the tubing string out into the annulus). To accomplish this there are two or more separatory passages that carry the diverted production fluid from the tubing string to the annular space. As the production fluid is diverted into the annulus, it undergoes turbulence. Due to the difference in densities the free gas will separate from the liquid. The free gas then ascends up the annulus and the heavier production fluid descends down to the area around the casing packer. At this point there are liquid intakes to lift the production fluid up in a concentric chamber located around the tubing string. The production fluid ascends up through this concentric chamber and passes around the separatory passages mentioned above. At a point higher than the separatory passages, the concentric chamber terminates and the relatively gas-free production fluid reenters the tubing string and ascends up to the surface.

BRIEF DESCRIPTION OF THE DRAWINGS

FIG. 1 is a cross-sectional view along the lengthwise axies of a spill-over tube design as it is placed in a wellbore;

FIG. 2 is a cross-sectional view along the lengthwise axis of the concentric chamber gas anchor;

FIG. 3 is a cross-sectional view along the width of the concentric chamber gas anchor in the area of the separatory passages; and FIG. 4 is a cross-sectional view along the width of the concentric chamber gas anchor in the area of the annular intake.

DETAILED DESCRIPTION OF THE INVENTION

To show an example of the prior art, FIG. 1 discloses a spill-over tube design for a downhole gas anchor. Here, a tubing string 2 rises from a well area 3 in the well where petroleum is gathered. For example, petroleum may be withdrawn from a subterranean formation through perforations 4 in the well casing 5. After the petroleum flows through the perforations 4, into the well area 3, and up the tubing string 2, it goes past a casing packer 6 and then a deep set, tubing retrievable, subsurface safety valve 7. (A subsurface safety valve is required for the control of the well. By hydraulically opening or closing this valve, one can get access to, or close in, the subterranean producing formation below the valve 7.) The subsurface safety valve 7 is controlled by a control line 8 and a balance line 9.

The next item the petroleum may encounter as it rises up the tubing string 2 is a landing nipple with a plug 10 which is inserted into the string 2 to divert the flow of production fluid up a spill-over tube 11. The spill-over tube 11 functions to turbulently divert the production fluid so that free gas is separated from the liquid. Any gas that is separated flows up an annular space 12 to be collected at the surface and the remaining liquid oil flows down the annular space 12. Once the oil flows back down the annulus 12 it encounters perforations 13 in the tubing string 2 at a point above the landing nipple with the plug 10 but below the outlet for the spill-over tube 11. These perforations 13 allow the oil to flow back up the tubing string 2 so that it can be lifted to the surface.

A triple string hydraulic pump 19 provides the lifting action for the petroleum. It is actuated by a fluid that enters the pump 19 by a power fluid intake line 21 and leaves by a power fluid return line 20. Liquid petroleum returns to the surface by line 2a.

FIG. 2 shows the present invention. It is a concentric-chamber, downhole-gas anchor 100. As before, the present invention has a tubing string 22 that withdraws hydrocarbons from an area 23 within the well. Hydrocarbons enter this area 23 by passing through perforations 24 in a casing 25. There is a casing packer 26 and a deep set, tubing retrievable, subsurface safety valve 27. The subsurface safety valve 27 is serviced by a control line 28 and a balance line 29. There also is a landing nipple with a plug 30 in the tubing string 22 and two or more separatory passages 31 just below the landing nipple 30. An annular space 32 is defined by the well casing 25 and an exterior shell 35 of the gas anchor 100. Triangular support plates 37 keep the exterior shell 35 of the gas anchor 100 away from the tubing string 22. (In FIG. 2 two plates 37 are shown whereas FIG. 4 shows three plates 37.) An intake 33 is placed below the two separatory passages 31 and just above the subsurface safety valve 27. The intake 33 is for a concentric chamber 34 that is formed between the tubing string 22 and an exterior shell 35 for the gas anchor 100. There are perforations 36 in the tubing string 22 which permit fluid entry into the tubing string 22 from the concentric chamber 34.

A triple string hydraulic pump 39 provides the lifting action for the petroleum. It is actuated by a fluid that enters the pump 39 by a power fluid intake line 41 and leaves by a power fluid return line 40. Liquid petroleum returns to the surface by line 22a.

FIG. 3 discloses a width-wise cross section of the concentric chamber gas anchor in the area above the separatory passages. Here, a milled space 38 carries the liquid petroleum around the separatory passages 31.

FIG. 4 shows another width-wise cross section only it is further down the gas anchor 100 at the intake 33 for the concentric chamber 34. Here, three triangularly shaped support plates 37 are illustrated to maintain an outer shell 35 of the gas anchor away from the tubing string 22.

The device operates as follows, hydrocarbons are drawn from a producing formation by the lifting action of the subsurface pump 39. The hydrocarbons pass through perforations 24 in the well casing 25 and accumulate in a space in the well 23. Then, the hydrocarbons are lifted up the production string 22, past the casing packer 26 and a subsurface safety valve 27, until the liquid contacts the landing nipple with the plug 30. At this point, the flow of production fluid is turbulently diverted into two or more separatory passages 31 and out into the annulus 32. As a result, any free gas disassociates from the liquid and ascends up the annulus 32 where it is collected at the surface. The liquid hydrocarbons flow down the annulus 32 and accumulate because they are eventually stopped by the casing packer 26. Then, they are lifted at the intake 33 for the concentric gas anchor 100 and proceed up the chamber 34 through the milled space 38 and around the separatory passages 31. Thereafter, the perforations 36 provide an intake for the liquid to reenter the tubing string 22. The liquid cannot go back down the tubing string 22 for two reasons, its path is blocked off by the landing nipple with the plug 30, and the lifting action of the subsurface pump maintains its upward mobility.

Additional advantages of this design include triangular support plates 37 for the outer shell 35 of the concentric chamber gas anchor 100, and the encapsulation of the control line 28 and balance line 29 within the gas anchor annulus 34. The advantage of the triangular support plates 37 is: that they function as guides when a downhole assembly is run; as well as providing support for the outer shell 35. The advantage of the encapsulation of the control line 28 and balance line 29 is that the gas anchor 100 is further streamlined to facilitate future "wash-over" and retrieval operations.

Since many modifications and variations of the present invention are possible within the spirit of this disclosure, it is intended that the embodiments disclosed are only illustrative and not restrictive. For that reason, reference is made to the following claims rather than to the specific description to indicate the scope of this invention.

What is claimed is:

1. A concentric chamber gas anchor for separating free gas from a well production fluid, which is located downhole in a hydrocarbon producing well, comprising:
   (a) tubular casing for the well;
   (b) a concentrically spaced, interior tubular flow channel for the recovery of production fluid, which contains oil, water and gas;
   (c) means for lifting a relatively gas free mixture of production liquid up said flow channel;
   (d) an annular space formed between said tubular casing and said flow channel;
   (e) a casing packer located between said tubular casing and said flow channel to seal off a lower portion of said annular space;
   (f) a subsurface safety valve located in said flow channel above said casing packer;
   (g) a tubing plug located in said flow channel above said subsurface safety valve to divert the flow of production fluid, said tubing plug being a removable plug allowing access to any equipment further down the well and allowing bypass of the gas anchor device;
   (h) at least one separatory passage for carrying said diverted production fluid from said flow channel to said annular space, each passage being only connected between said flow channel and said annular space, said separatory passage being adapted to facilitate a primary gas/liquid separation;
   (i) a concentric chamber located around said flow channel in the area of said separatory passage and said tubing plug formed by attaching an outer shell to the center piece of tubing;
   (j) a fluid intake located in the lower portion of said concentric chamber below said separatory passage and above said casing packer to allow the reentry of the diverted liquid production that has flowed out of said separatory passage, and down the annular space for containment in the area that has been blocked off by the casing packer;
   (k) a milled space located adjacent said separatory passage, the milled space is in fluid communication with the concentric chamber and carries fluid around said separatory passage; and
   (l) perforations on the center tubing located above said separatory passage to allow the reentry of liquid production from the said concentric chamber to said flow channel.

2. A concentric chamber gas anchor for separating free gas from a well production fluid, which is located downhole in a hydrocarbon producing well, comprising:

(a) tubular casing for the well;
(b) a concentrically spaced, interior tubular flow channel for the recovery of production fluid, which contains oil, water and gas;
(c) means for lifting a relatively gas free mixture of production liquid up said flow channel;
(d) an annular space formed between said tubular casing and said flow channel;
(e) a casing packer located between said tubular casing and said flow channel to seal off a lower portion of said annular space;
(f) a subsurface safety valve located in said flow channel above said casing packer;
(g) a tubing plug located in said flow channel above said subsurface safety valve to divert the flow of production fluid;
(h) at least one separatory passage for carrying said diverted production fluid from said flow channel to said annular space, each passage being only connected between said flow channel and said annular space, said separatory passage being adapted to facilitate a primary gas/liquid separation;
(i) a concentric chamber located around said flow channel in the area of said separatory passage and said tubing plug formed by attaching an outer shell to the center piece of tubing;
(j) a fluid intake located in the lower portion of said concentric chamber below said separatory passage and above said casing packer to allow the reentry of the diverted liquid production that has flowed out of said separatory passage, and down the annular space for containment in the area that has been blocked off by the casing packer;
(k) a milled space located adjacent said separatory passage, the milled space is in fluid communication with the concentric chamber and carries fluid around said separatory passage; and
(l) perforations on the center tubing located above said separatory passage to allow the reentry of liquid production from the said concentric chamber to said flow channel;
(m) triangular plates, said triangular plates fixably attached under said concentric chamber whereby said plates serve as guides for equipment run into the well.

3. A concentric chamber gas anchor for separating free gas from a well production fluid, which is located downhole in a hydrocarbon producing well, comprising:
(a) tubular casing for the well:
(b) a concentrically spaced, interior tubular flow channel for the recovery of production fluid, which contains oil, water and gas;
(c) means for lifting a relatively gas free mixture of production liquid up said flow channel;
(d) an annular space formed between said tubular casing and said flow channel;
(e) a casing packer located between said tubular casing and said flow channel to seal off a lower portion of said annular space;
(f) a subsurface safety valve located in said flow channel above said casing packer;
(g) a tubing plug located in said flow channel above said subsurface safety valve to divert the flow of production fluid;
(h) at least one separatory passage for carrying said diverted production fluid from said flow channel to said annular space, each passage being only connected between said flow channel and said annular space, said separatory passage being adapted to facilitate a primary gas/liquid separation;
(i) a concentric chamber located around said flow channel in the area of said separatory passage and said tubing plug formed by attaching an outer shell to the center piece of tubing;
(j) a fluid intake located in the lower portion of said concentric chamber below said separatory passage and above said casing packer to allow the re-entry of the diverted liquid production that has flowed out of said separatory passage, and down the annular space for containment in the area that has been blocked off by the casing packer;
(k) a milled space located adjacent said separatory passage, the milled space is in fluid communication with the concentric chamber and carries fluid around said separatory passage;
(l) perforations on the center tubing located above said separatory passage to allow the re-entry of liquid production from the said concentric chamber to said flow channel; and
(m) said gas anchor apparatus shaped in the form of a cylinder, said cylinder enclosing control and balance lines.

4. A concentric chamber gas anchor for separating free gas from a well production fluid, which is located downhole in a hydrocarbon producing well, comprising:
(a) tubular casing for the well:
(b) a concentrically spaced, interior tubular flow channel for the recovery of production fluid, which contains oil, water and gas;
(c) means for lifting a relatively gas free mixture of production liquid up said flow channel;
(d) an annular space formed between said tubular casing and said flow channel;
(e) a casing packer located between said tubular casing and said flow channel to seal off a lower portion of said annular space;
(f) a subsurface safety valve located in said flow channel above said casing packer;
(g) a tubing plug located in said flow channel above said subsurface safety valve to divert the flow of production fluid;
(h) at least one separatory passage for carrying said diverted production fluid from said flow channel to said annular space, each passage being only connected between said flow channel and said annular space, said separatory passage being adapted to facilitate a primary gas/liquid separation;
(i) a concentric chamber located around said flow channel in the area of said separatory passage and said tubing plug formed by attaching an outer shell to the center piece of tubing, the concentric chamber enclosing control and balance lines for the subsurface safety valve;
(j) a fluid intake located in the lower portion of said concentric chamber below said separatory passage and above said casing packer to allow the re-entry of the diverted liquid production that has flowed out of said separatory passage, and down the annular space for containment in the area that has been blocked off by the casing packer;
(k) a milled space located adjacent said separatory passage, the milled space is in fluid communication with the concentric chamber and carries fluid around said separatory passage; and
(l) perforations on the center tubing located above said separatory passage to allow the re-entry of liquid production from the said concentric chamber to said flow channel.

* * * * *